United States Patent
You et al.

(10) Patent No.: US 10,084,328 B2
(45) Date of Patent: Sep. 25, 2018

(54) CHARGING ASSEMBLY OF MOBILE TERMINAL

(71) Applicant: LG ELECTRONICS INC., Seoul (KR)

(72) Inventors: Taehoon You, Seoul (KR); Shin Han, Seoul (KR); Kyungtae Yang, Seoul (KR); Siyoung Park, Seoul (KR); Hyunseok Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 15/314,830

(22) PCT Filed: Jan. 16, 2015

(86) PCT No.: PCT/KR2015/000484
§ 371 (c)(1),
(2) Date: Nov. 29, 2016

(87) PCT Pub. No.: WO2015/182848
PCT Pub. Date: Dec. 3, 2015

(65) Prior Publication Data
US 2017/0201108 A1   Jul. 13, 2017

(30) Foreign Application Priority Data

May 30, 2014  (KR) .......................... 10-2014-0066388

(51) Int. Cl.
*H02J 7/00*   (2006.01)
*H02J 50/90*   (2016.01)
(Continued)

(52) U.S. Cl.
CPC .......... *H02J 7/0044* (2013.01); *H01F 7/0252* (2013.01); *H01F 27/2804* (2013.01);
(Continued)

(58) Field of Classification Search
CPC ........... H02J 7/0044; H02J 50/90; H02J 7/025
(Continued)

(56) References Cited

U.S. PATENT DOCUMENTS

2008/0234009 A1\* 9/2008 Zeiger .................. H02J 7/0044
                                                              455/573
2010/0156343 A1   6/2010 Jung
(Continued)

FOREIGN PATENT DOCUMENTS

EP   1096641 A1   5/2001
EP   2182706 A1   5/2010
(Continued)

*Primary Examiner* — Suchin Parihar
(74) *Attorney, Agent, or Firm* — Birch, Stewart, Kolasch & Birch, LLP

(57) ABSTRACT

The present disclosure relates to a charging assembly of a mobile terminal. Disclosed is a charging assembly of a mobile terminal, comprising: a charger; and a mobile terminal. The charger comprises: an upper case forming a top surface and a side surface; and a lower case, coupled to the lower portion of the upper case, for forming an inner space in which parts are embedded. The mobile terminal is seated in the charger and chargeable by being electrically connected to the charger. In a plurality of areas within the inner space, magnetic elements are arranged, and in the mobile terminal, a metal member is arranged in such a manner that at least a part thereof is arranged in an area which overlaps or is adjacent to the magnetic element so that the metal member is attached to the magnetic element due to attraction with the magnetic element. The top surface comprises: an inclined portion which is bent downward so as to be in contact with the rear edge portion of the mobile terminal; and a flat base portion which extends from the inclined portion and is in contact with the rear central portion of the mobile terminal, wherein the magnetic elements arranged in the plurality of areas are placed diagonally to each other.

18 Claims, 19 Drawing Sheets

(51) Int. Cl.
*H02J 50/80* (2016.01)
*H02J 50/12* (2016.01)
*H02J 50/70* (2016.01)
*H02J 50/40* (2016.01)
*H02J 7/02* (2016.01)
*H01F 27/28* (2006.01)
*H01F 38/14* (2006.01)
*H01F 7/02* (2006.01)
*H01F 27/36* (2006.01)

(52) U.S. Cl.
CPC .............. *H01F 38/14* (2013.01); *H02J 7/025* (2013.01); *H02J 50/12* (2016.02); *H02J 50/40* (2016.02); *H02J 50/70* (2016.02); *H02J 50/80* (2016.02); *H02J 50/90* (2016.02); *H01F 7/0247* (2013.01); *H01F 27/36* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 2014/0139422 | A1* | 5/2014 | Mistry | G06F 3/014 |
| | | | | 345/156 |
| 2014/0375246 | A1* | 12/2014 | Boysen, III | H02J 5/005 |
| | | | | 320/101 |
| 2015/0222141 | A1* | 8/2015 | Yamazaki | H02J 7/025 |
| | | | | 320/103 |
| 2017/0127196 | A1* | 5/2017 | Blum | H02J 50/80 |
| 2017/0187722 | A1* | 6/2017 | Roundtree | H04W 4/06 |
| 2017/0261943 | A1* | 9/2017 | Kato | G04B 37/1486 |

FOREIGN PATENT DOCUMENTS

| | | |
|---|---|---|
| JP | 2009-544275 A | 12/2009 |
| KR | 10-2002-0082192 A | 10/2002 |
| KR | 10-2003-0011384 A | 2/2003 |
| KR | 10-2008-0035895 A | 4/2008 |
| KR | 10-2014-0019955 A | 2/2014 |
| WO | 2007/090168 A2 | 8/2007 |
| WO | 2008/137996 A1 | 11/2008 |

\* cited by examiner

CHARGING ASSEMBLY OF MOBILE TERMINAL

CROSS REFERENCE TO RELATED APPLICATIONS

This application is the National Phase of PCT International Application No. PCT/KR2015/000484, filed on Jan. 16, 2015, which claims priority under 35 U.S.C. 119(a) to Patent Application No. 10-2014-0066388, filed in the Republic of Korea on May 30, 2014, all of which are hereby expressly incorporated by reference into the present application.

TECHNICAL FIELD

The present disclosure relates to a charging assembly of a mobile terminal capable of charging a mobile terminal by seating the mobile terminal on a charger.

BACKGROUND ART

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

Many efforts include not only changes and improvement of structural components implementing a mobile terminal but also software improvement to support and improve functions of the terminal.

In a case, magnetic force is used for mounting a mobile terminal on a charger for charging. For example, a magnet is disposed in the charger and a metal member is disposed in the mobile terminal. Accordingly, attractive force generated between the metal member and the magnet allows the mobile terminal to be mounted on the charger.

However, in this case, one magnet and one metal member are used and thereby the mobile terminal and the charger are sometimes misaligned with each other.

DISCLOSURE OF THE INVENTION

The present invention is to solve the aforementioned problem and other drawbacks. Also, another aspect of the present invention is to provide a charging assembly of a mobile terminal capable of preventing damage on a magnetic flux line of a magnetic product using a shielding structure.

To achieve these and other advantages and in accordance with the purpose of the present invention, as embodied and broadly described herein, there is provided a charging assembly including a charger, and a mobile terminal. The charger may include an upper case forming a top surface and a side surface, and a lower case, coupled to the lower portion of the upper case, for forming an inner space in which parts are embedded. The mobile terminal may be seated in the charger and chargeable by being electrically connected to the charger. In a plurality of areas within the inner space, magnetic elements may be arranged, and in the mobile terminal, a metal member may be arranged in such a manner that at least a part thereof is arranged in an area which overlaps or is adjacent to the magnetic element so that the metal member is attached to the magnetic element due to attraction with the magnetic element. The top surface may include an inclined portion which is bent downward so as to be in contact with the rear edge portion of the mobile terminal, and a flat base portion which extends from the inclined portion and is in contact with the rear central portion of the mobile terminal, wherein the magnetic elements arranged in the plurality of areas are placed diagonally to each other.

The charger may further include an external battery provided within the inner space to operate the mobile terminal. The charger may include a charging connection terminal disposed on one side at an inner side thereof, configured as a plurality of pins, and externally exposed, and at least one of the magnetic elements may be provided adjacent to the charging connection terminal.

The magnetic element arranged on at least one area of the plurality of areas may be formed in a manner that at least two divided magnetic elements are arranged in parallel to each other on the same plane. The magnetic elements may also be laminated into at least two layers.

The magnetic element may be accommodated in a metal container, and a metal sheet shielding a magnetic field may be provided below the metal container.

A part of the charging connection terminal may be externally exposed through the top surface, and the mobile terminal may be provided with a charging terminal brought into contact with the charging connection terminal. The charging connection terminal may be a pogo pin with an elastic member embedded therein.

A part of the charging connection terminal may be surrounded by a magnet provided within the inner space.

The mobile terminal may include a front case accommodating a display unit therein, a rear case provided on a lower portion of the front case and having components therein, and a battery case provided on a lower portion of the rear case and having an inner battery therein, the battery case covering the rear case. The charging terminal may be disposed in an inwardly recessed accommodation groove.

The metal member may be provided at an inner side of the rear case, the metal member may be provided by one or in plurality, and the display unit may output which one of the internal battery or external battery is used.

The charger may include a transmitting coil configured to transmit power in a wireless manner, and the mobile terminal may include a receiving coil configured to receive power in a wireless manner through transmission and reception with the transmitting coil. The power wirelessly received from the transmitting coil may be charged in the battery of the mobile terminal.

The transmitting coil may be a spiral type coil or a solenoid type coil, and the receiving coil may be a spiral type coil or a solenoid type coil.

The coil may include a first coil disposed at a center, and a plurality of second coils disposed around the first coil. The transmitting coil may be disposed on a top surface of a first printed circuit board provided within the charger, and the receiving coil may be disposed on a lower surface of a second printed circuit board provided within the mobile terminal.

Advantageous Effect

Description will hereinafter be given of effects of a mobile terminal and a control method thereof according to the present invention.

According to at least one of embodiments disclosed herein, the mobile terminal can easily be placed on a charging position by magnetic force during charging the mobile terminal using a charger.

According to at least one of embodiments disclosed herein, an affection of a magnetic field can be minimized by a shielding structure. A non-contact between a charging connection terminal and a charging terminal can be prevented by more increasing attraction by a magnetic element than a repulsive force between the charging connection terminal and the charging terminal.

An additional range of application probability of the present invention will be obvious from detailed description to be provided hereinafter. However, many variations and modification made within the scope and the range of the present invention can be obviously understood by those skilled in the art. Therefore, it should be construed that specific embodiments such as the preferred embodiments of the present invention are merely illustrative.

MODES FOR CARRYING OUT THE PREFERRED EMBODIMENTS

Figure 1A:
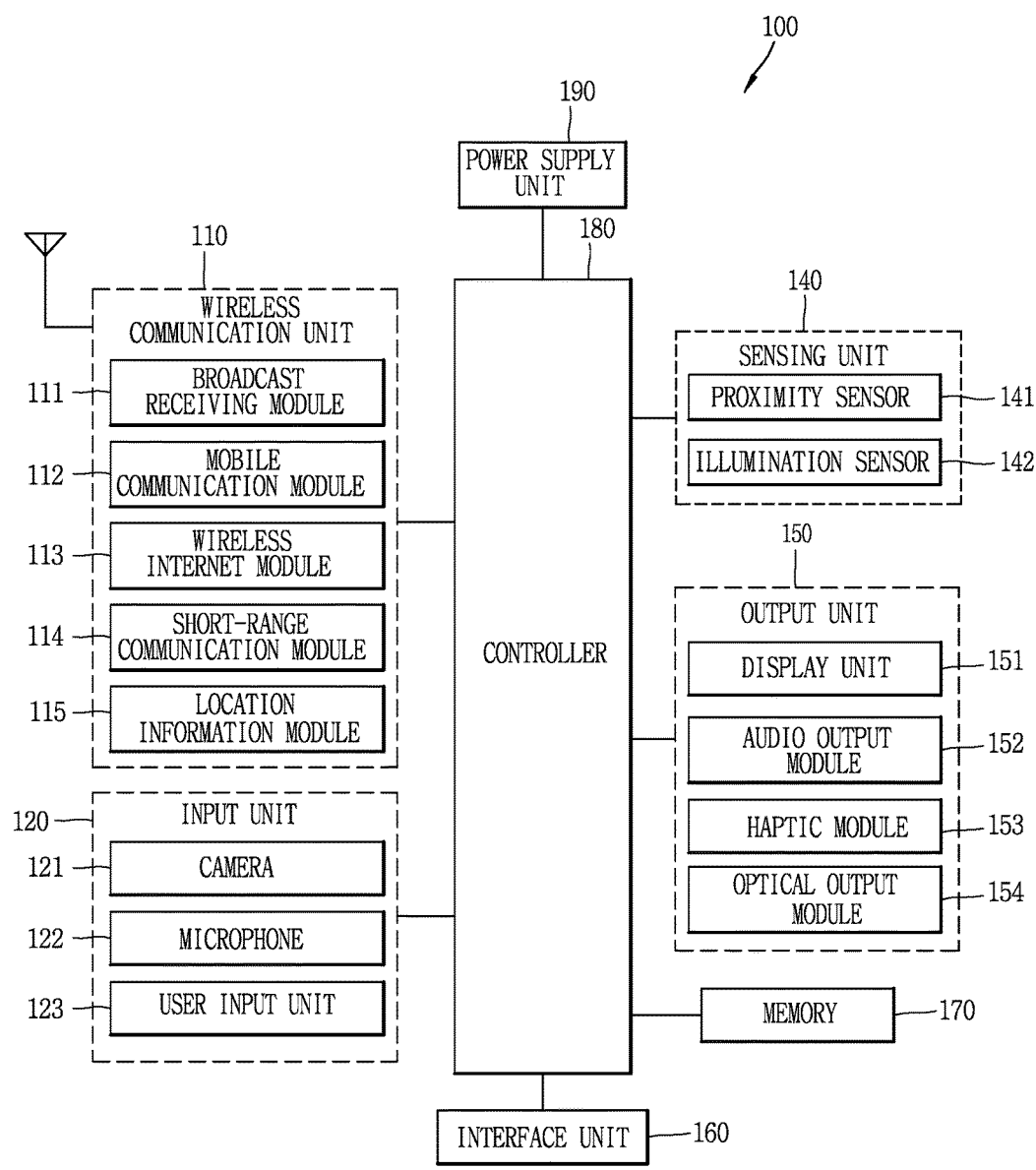
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1B:
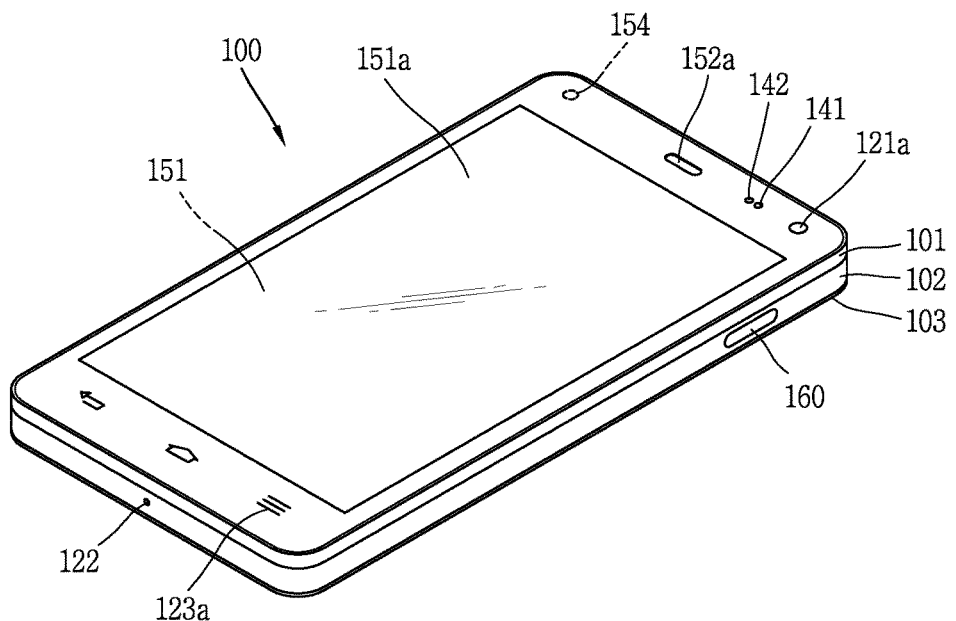
FIGS. 1B and 1C are conceptual views illustrating one example of a mobile terminal, viewed from different directions.
Figure 1C:
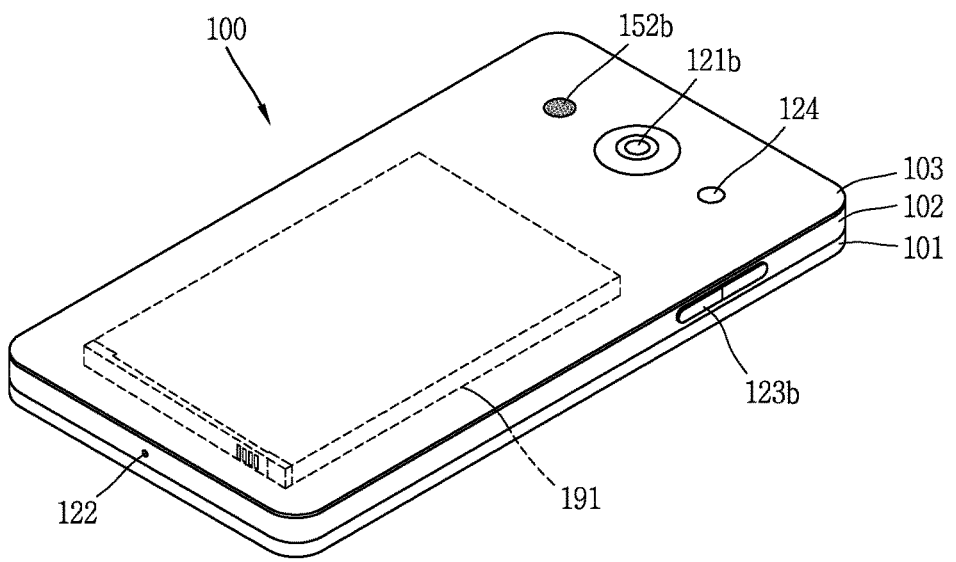

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components illustrated in FIG. 1A is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, a mobile terminal may be configured as a device which is wearable on a human body. Such devices go beyond the usual technique of a user grasping the mobile terminal using his hand. Examples of the wearable device include a smart watch, a smart glass, a head mounted display (HMD), and the like. Hereinafter, examples of the mobile terminals extended to the wearable devices will be described.

The wearable device is able to exchange data (or cooperate) with another mobile terminal 100. The short-range communication module 114 may sense or recognize the wearable device, and permit communication between the wearable device and the mobile terminal 100. In addition, when the sensed wearable device is a device which is authenticated to communicate with the mobile terminal 100, at least part of data processed in the mobile terminal 100 may be transmitted to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
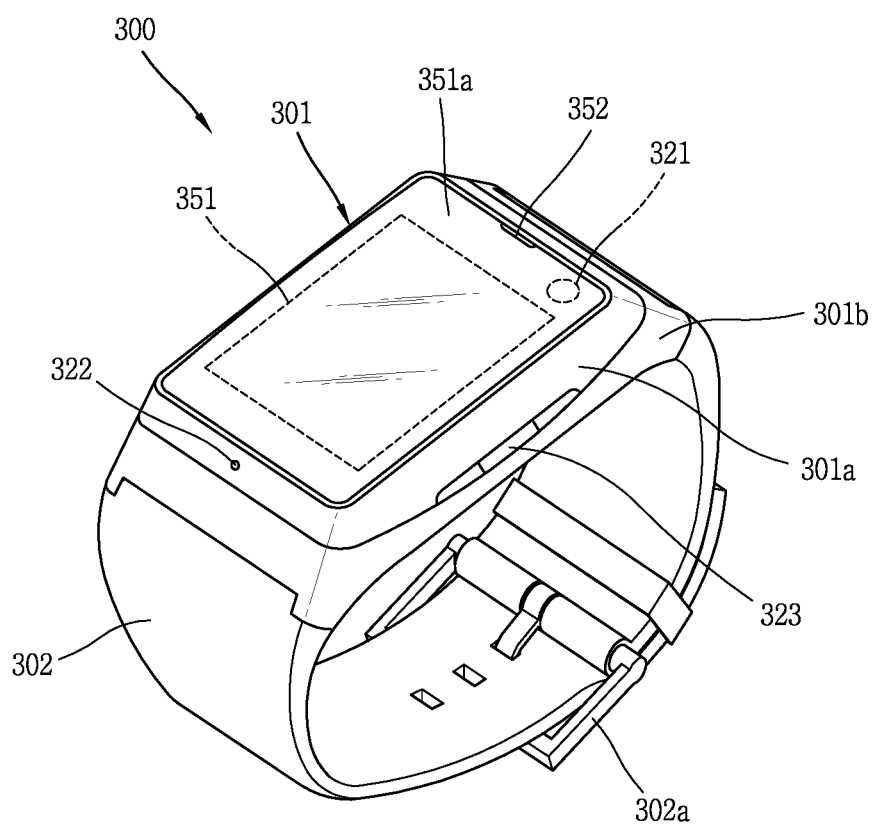
FIG. 2 is a perspective view of one example of a watch type mobile terminal in accordance with another exemplary embodiment.

FIG. 2 is a perspective view of a watch type mobile terminal 300 according to another exemplary embodiment, viewed in one direction.

Referring to FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A to 1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. The display unit 351 includes a touch sensor so that the display unit can function as a touch screen. As illustrated, a window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, it may function as the user input unit 323, and a separate key may thus not be provided on the main body 501.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

Meanwhile, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Hereinafter, description will be given of embodiments related to a control method which can be implemented in the mobile terminal having such configuration, with reference to the accompanying drawings. It will be obvious to those skilled in the art that the present invention can be specified into other specific forms without departing from the scope and essential features of the present invention.

Figure 3:
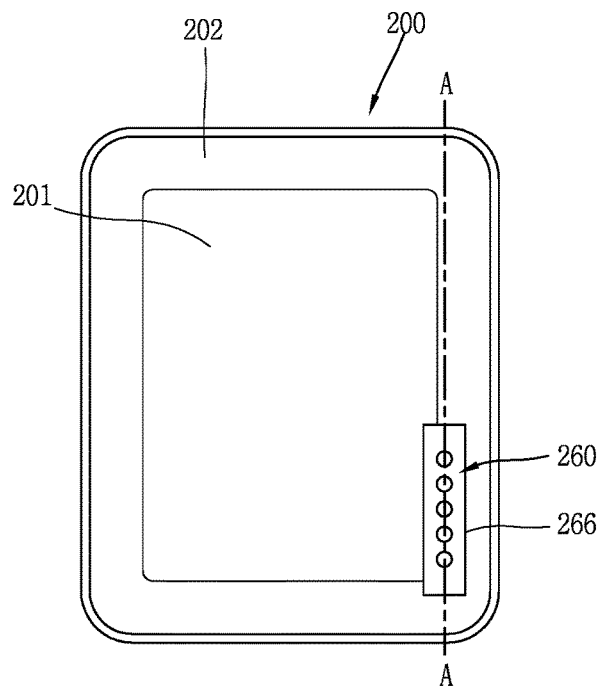
FIG. 3 is a planar view of a charger in accordance with one embodiment of the present invention.
Figure 4:
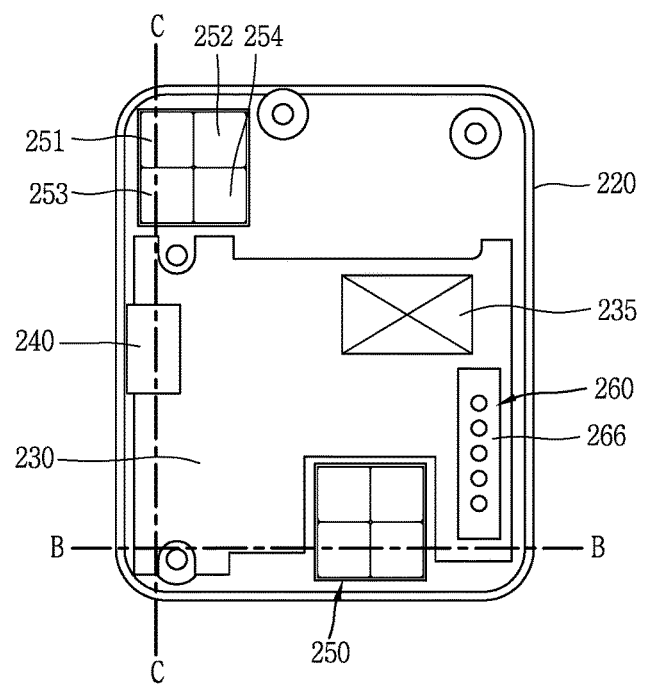
FIG. 4 is an inner planar view illustrating a removed state of a top surface of FIG. 3.
Figure 5A:
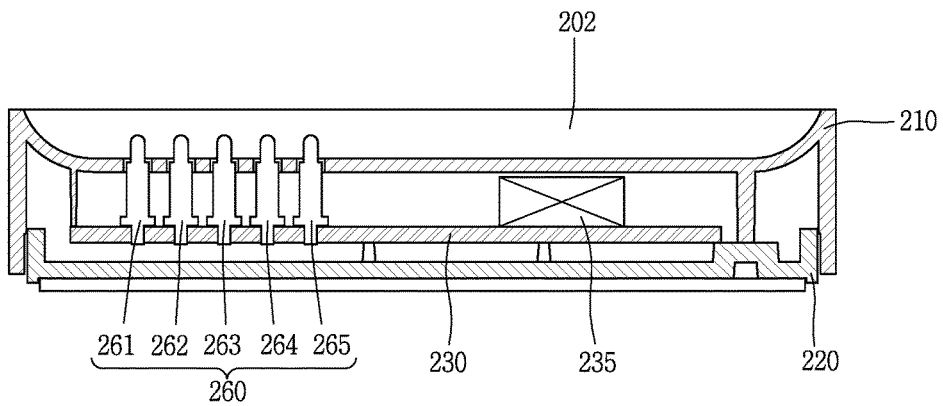
FIG. 5 is a sectional view taken along the line AA of FIG. 3.
Figure 5B:
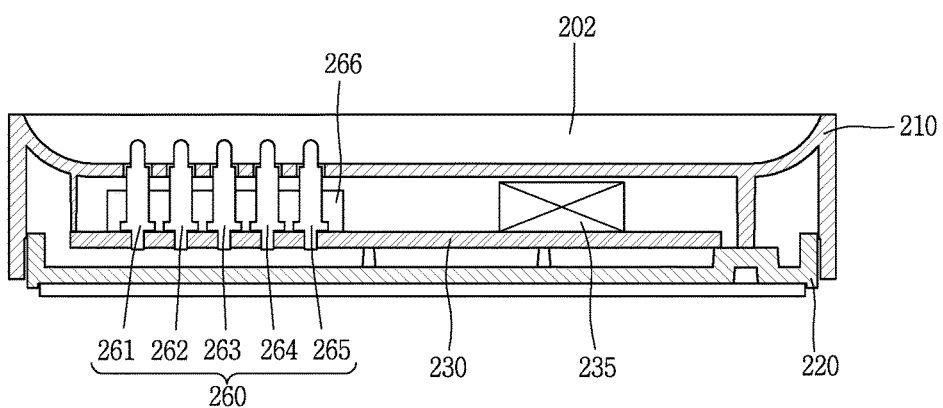
Figure 5C:
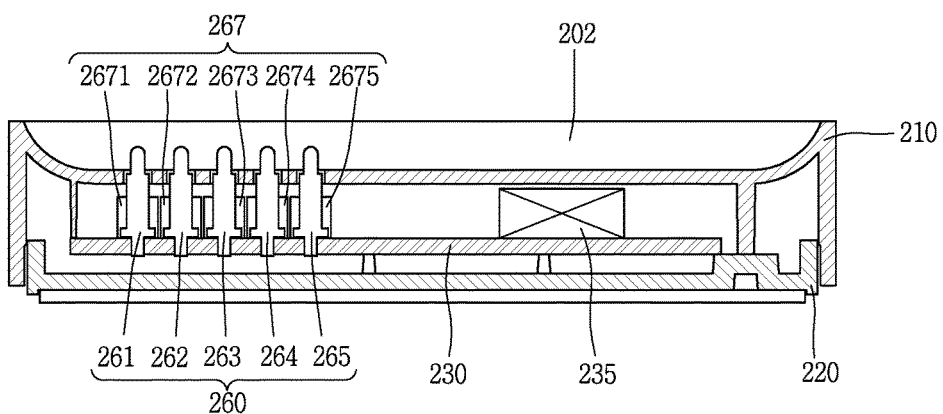
Figure 6:
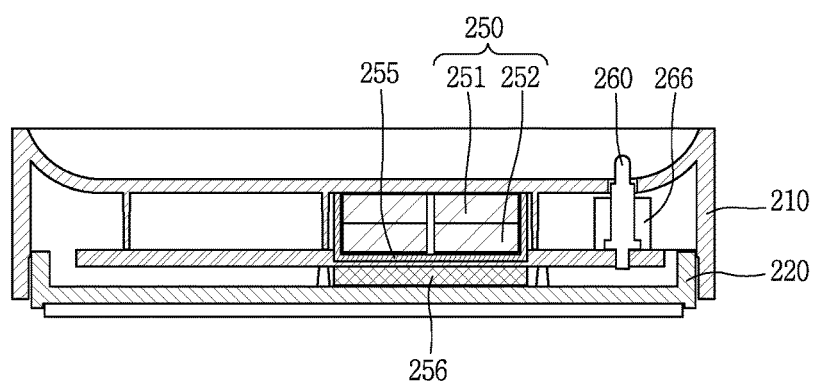
FIG. 6 is a sectional view taken along the line BB of FIG. 4.
Figure 7:
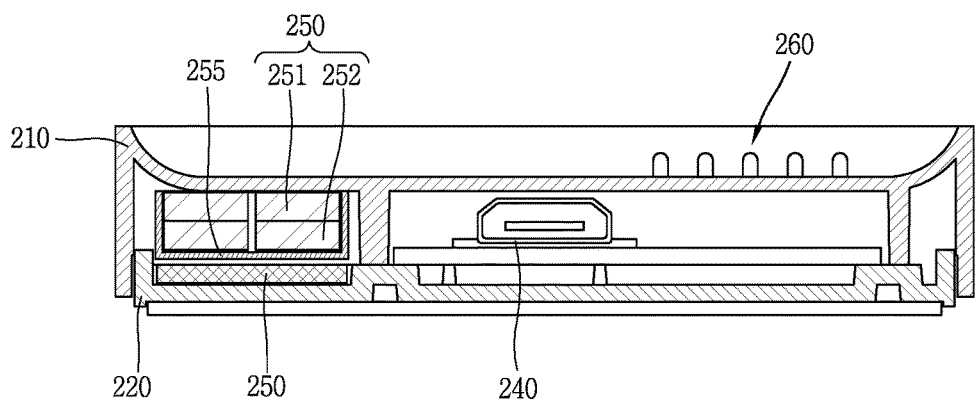
FIG. 7 is a sectional view taken along the line CC of FIG. 4.
Figure 8:
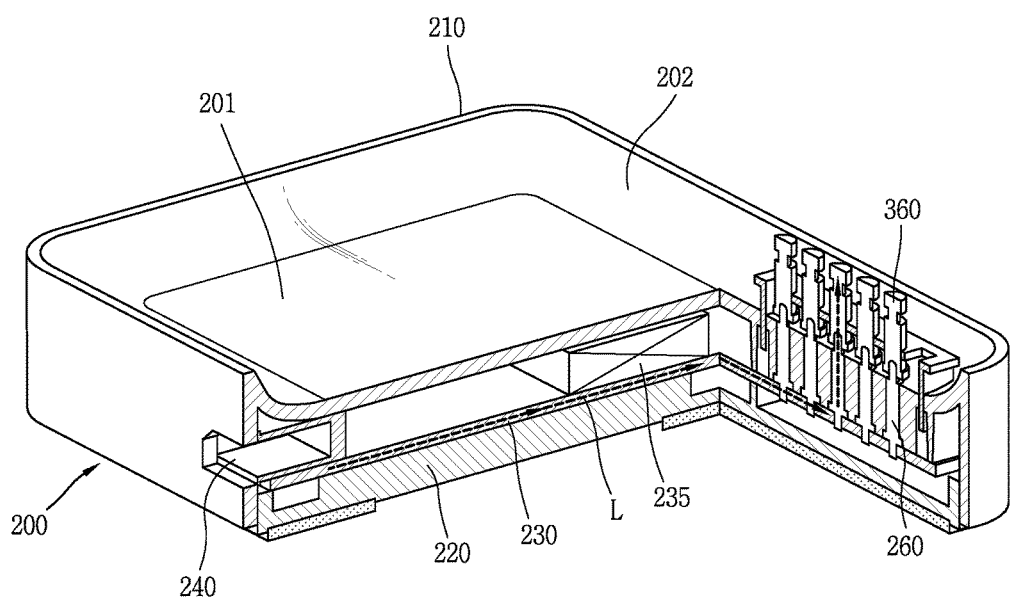
FIG. 8 is a cutoff perspective view of a charger in accordance with one embodiment of the present invention.

FIG. 3 is a planar view of a charger in accordance with one embodiment of the present invention, FIG. 4 is an inner planar view illustrating a removed state of an top surface of FIG. 3, FIG. 5 is a sectional view taken along the line AA of FIG. 3, FIG. 6 is a sectional view taken along the line BB of FIG. 4, FIG. 7 is a sectional view taken along the line CC of FIG. 4, and FIG. 8 is a cutoff perspective view of a charger in accordance with one embodiment of the present invention.

Hereinafter, description will be given of a charger 200 according to a first embodiment of the present invention with reference to FIGS. 3 to 7.

A charging method for a mobile terminal 300 according to one embodiment of the present invention may include a wired charging method and a wireless charging method. The wired charging method, as illustrated in FIGS. 3 to 7, is configured in a manner that a charging connection terminal 260 is provided on the charger 200 and a charging terminal 360 is provided on the mobile terminal 300 such that charging is enabled by electrically connecting the charging connection terminal 260 and the charging terminal 360 in a direct contact manner.

According to one embodiment of the present invention, the charger 200 may include a charging connection terminal 260 and a magnetic element 250. The charging connection terminal 260 may be provided with a plurality of pins 261, 262, 263, 264 and 265 as a set at one side within the charger 200, and the magnetic element 250 is provided adjacent to the charging connection terminal 260. Among the plurality of pins 261, 262, 263, 264 and 265, pins 261 and 262 are data connection pins for data communication with the mobile terminal 300, the pins 263 and 264 are pins used for charging and forming a current path L during the charging, and the pin 265 is a ground pin and used for earthing. That is, as illustrated in FIG. 8, the electric charging path L is formed, starting from a USB port 240 to the charging connection terminal 260 via a printed circuit board 230. The charging connection terminal 260 is electrically connected with a charging terminal 360 of the mobile terminal 300 such that a current can be charged in the mobile terminal 300.

The magnetic element disclosed herein may be a magnet, for example, and may not be specifically limited to any if it can attract a metal member 374 to be explained later by magnetic force.

The charger 200 includes an upper case 210 forming a top surface and side surfaces, and a lower case 220 coupled to a lower portion of the upper case 210 and forming an inner space for accommodating components therein. The top surface of the charger 200 is formed concave and a lower surface of the mobile terminal 300 is formed convex to correspond to the top surface of the charger 200 such that the mobile terminal can be easily seated on the charger 200. That is, the upper case 210 includes a base portion 201 located at a center thereof, occupying most of the top surface and formed in a shape of a flat plate, and an inclined portion 202 upwardly extending from the base portion 201 in a bent (curved) manner. In this instance, the inclined portion 202 is brought into contact with a rear edge portion 332 of the mobile terminal 300, and the base portion 201 is brought into contact with a rear central portion 331 of the mobile terminal 300.

In this instance, to facilitate coupling between the charger 200 and the mobile terminal 300, the magnetic element 250 may be provided within the inner space of the charger 200, and a metal member 375 which is attached to the magnetic element 250 by attraction with the magnetic element 250. If the magnetic element 250 and the metal material 375 are provided by only one each, the magnetic element 250 and the metal member 375 may be coupled to each other in a misaligned state even though the attractive force is applied therebetween. This results from that the attractive force is applied as soon as the metal member 375 is located near the magnetic element 250 and thereby a charging position is fixed even before the mobile terminal 300 and the charger 200 find proper positions.

To overcome this, in one embodiment of the present invention, the magnetic elements 250 are provided in plurality, which are disposed on a plurality of areas, and at least one of the magnetic elements 250 is disposed adjacent to the charging connection terminal 260. As such, the reason why the at least one magnetic element 250 is disposed adjacent to the charging connection terminal 260 is that the charging connection terminal 260 can be spaced apart from the charging terminal 360 provided on one side of the rear surface of the mobile terminal 300 due to a contact therebetween. Specifically, the charging connection terminal 260 such as a pogo pin having an elastic member (spring) therein, is spaced apart from the charging terminal 360 due to elastic force applied by the elastic member. To minimize the spaced distance between the charging connection terminal 260 and the charging terminal 360, the magnetic element is formed adjacent to the charging connection terminal 260.

In this instance, the attractive force between the magnetic element 250 and the metal member 375 should be greater than the elastic force of the elastic member which separates the charging connection terminal 260 and the charging terminal 360 from each other.

Also, in one embodiment of the present invention, a magnet 266, 267 may be disposed adjacent to the charging connection terminal 260 such that the charging connection terminal 260 can be easily brought into contact with the charging terminal 360. For example, a single magnet 266 may be disposed adjacent to the charging connection terminal 260 as illustrated in FIG. 5B, or magnets 267, namely, 2671, 2672, 2673, 2674 and 2675 may be disposed adjacent to the pins 261, 262, 263, 264, 265, respectively, as illustrated in FIG. 5C. The magnets 266, 267 are disposed within the inner space such that only upper portions of the pins 261, 262, 263, 264, 265 can be externally exposed. To this end, the magnets 262, 267 may be disposed on an upper portion of the first printed circuit board 230.

The charger 200 according to one embodiment disclosed herein may execute a function of charging the mobile terminal 300 and additionally operate the mobile terminal 300 by employing an external battery 235 (detachable battery) within the inner space of the charger 200. In other words, the external battery 235 may also be used as a battery of the mobile terminal 300. To this end, the external battery 235 is required to be recharged in advance. In this manner, when the external battery 235 is recharged in advance, the mobile terminal 300 can be used even in a discharged state of an internal battery 370 of the mobile terminal 300. In addition, even in a non-charged state of the external battery 235, the mobile terminal 300 can be operated by charging the internal battery 370.

That is, the charger 200 may be configured not only to charge the internal battery 370 of the mobile terminal 300 in response to power supply, but also to operate the mobile terminal 300 by the external battery 235 disposed within the inner space of the charger 200. Specifically, the external battery can be effectively used even when a power supply to the charger 235 outdoors is difficult.

Figure 11:
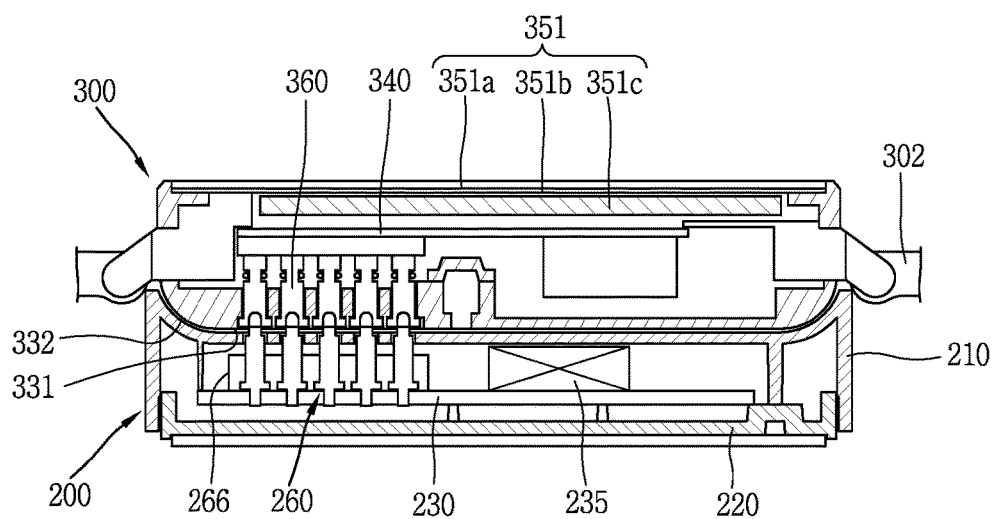
FIGS. 11 and 12 are sectional views illustrating a coupled state between a mobile terminal and a charger in accordance with one embodiment of the present invention.
Figure 12:
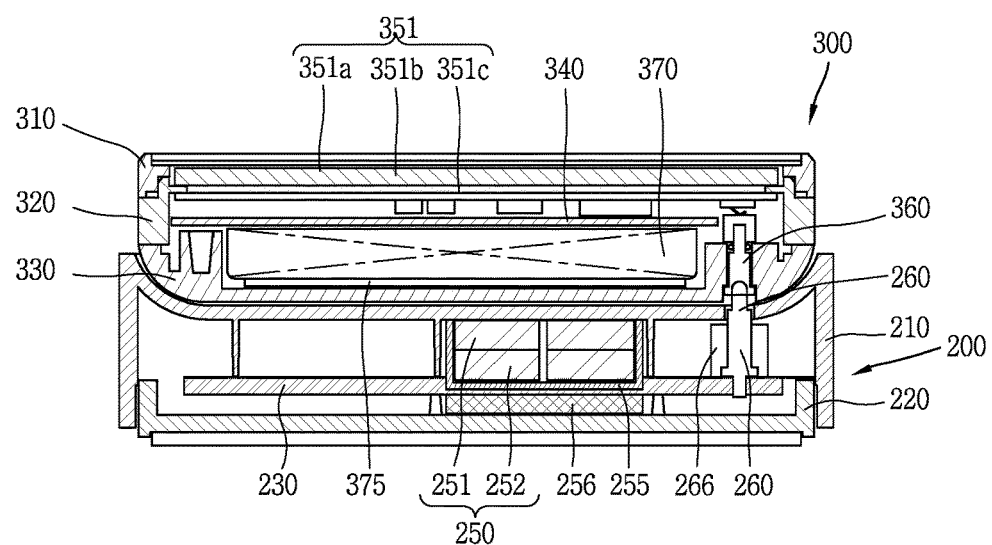

Meanwhile, FIGS. 11 and 12 are sectional views of a coupled state between a mobile terminal and a charger in accordance with one embodiment of the present invention.

As illustrated in FIGS. 11 and 12, the mobile terminal 300 includes a front case 310 provided on a top surface and accommodating a display unit 351, and a rear case 320 disposed on a lower portion of the front case 310 and having components mounted therein. A battery case 330 covering the rear case 320 is disposed on a rear surface of the rear case 320. A second printed circuit board 340 is disposed beneath the display unit 351, and the charging terminal 360 is electrically connected to the second printed circuit board 340. Also, the internal battery 370 is disposed beneath the second printed circuit board 340 and charged by the charger 200. The metal member 375 is disposed beneath the internal battery 370.

Figure 20:
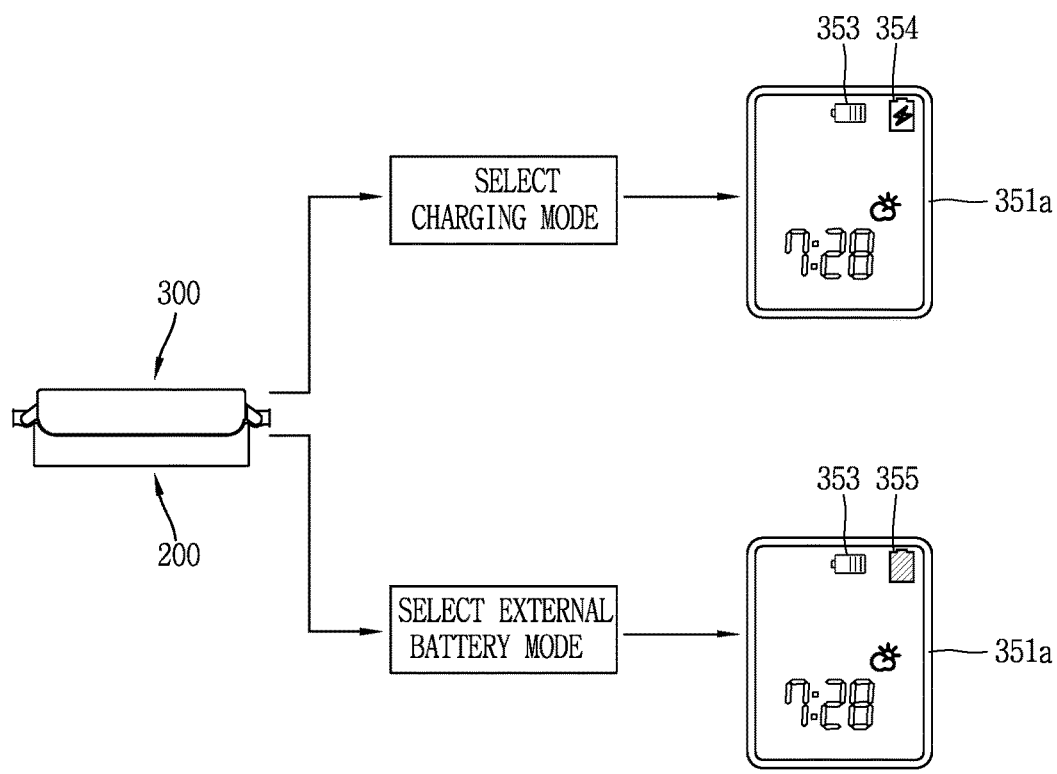
FIG. 20 is a conceptual view illustrating a usage example of a charger in accordance with one embodiment of the present invention.

In this instance, the display unit 351 includes a window 351a, a touch sheet 351b and an LCD module 351c. On the window 351a may be output whether or not the display unit 351 is operated by the internal battery 370 of the mobile terminal 300 or by the external battery 235 of the charger 200. That is, as illustrated in FIG. 20, whether to charge the mobile terminal 300 or operate the mobile terminal 300 using the external battery 235 may be selected. If a charging mode is selected, a charging state indicating lamp 353 of the internal battery 370 of the mobile terminal 300 and a charging indicating lamp 355 are output on the window 351a. On the other hand, if an external battery mode is selected, the charging state indicating lamp 353 of the internal battery 370 of the mobile terminal 300 and a charging state indicating lamp 355 of the external battery 235 are output on the window 351a. The selection of the charging mode or the external battery mode may be executed on the window 351a of the display unit 351, or by using a switch (not illustrated) of the charger 200. In this manner, in the external battery mode, it can be advantageously recognized which one of the batteries 235 and 370 is currently consumed.

In view of a characteristic of the magnetic element 250, magnetic force more increases as more dividing the magnetic element 250, and thus the magnetic force much more increases even using the magnetic element 250 in the same size by dividing the magnetic element 250 into a plurality of pieces. In one embodiment disclosed herein, in order to increase the attractive force between the magnetic element 250 and the metal member 375, as illustrated in FIG. 4, the magnetic element 250 is divided into a plurality of divided magnetic elements 251, 252, 253 and 254. That is, the magnetic element 250 may be configured in a manner of arranging the plurality of divided magnetic elements 251, 252, 253 and 254 on the same plane. This structure may be referred to as a parallel structure.

In addition, the magnetic element may be configured in a manner of laminating a plurality of layers to much more increase magnetic force. That is, as illustrated in FIGS. 6 and 7, the magnetic element 250 may include an upper layer 251 and a lower layer 252. This structure may be referred to as a laminated structure.

Meanwhile, in one embodiment disclosed herein, to minimize interference with magnetic force between the magnetic elements 250, as illustrated in FIG. 10, the magnetic elements 250 may be disposed on diagonal positions to each other. In this manner, as the magnetic elements 250 are disposed diagonal to each other, the mobile terminal 300 can be more accurately placed on the charger 200. For example, as illustrated in FIG. 10A, when the magnetic element 250a is disposed in a diagonal direction to the magnetic element 250b disposed at one side of the charging connection terminal 260, the attractive forces between the metal member 375 within the mobile terminal 300 and the magnetic elements 250a and 250b can be balanced, and thus the mobile terminal 300 can be placed at a correct position on the charger 200.

Figure 10A:
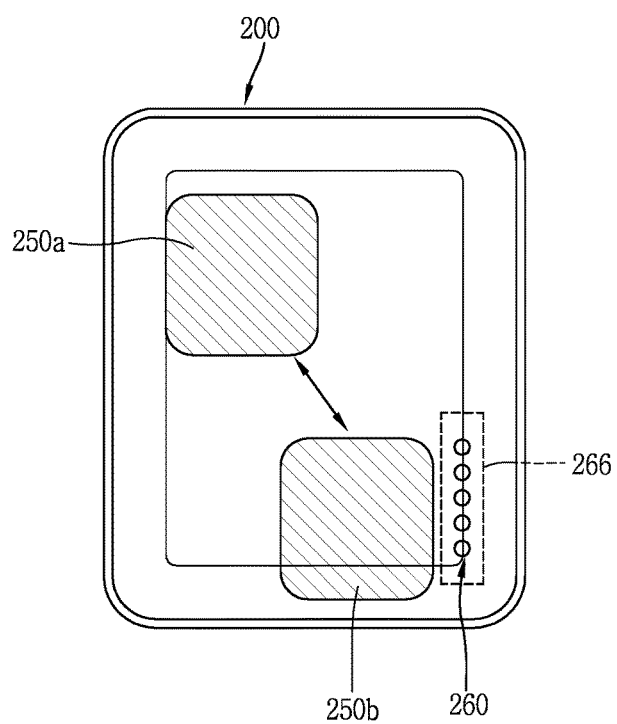
FIG. 10 is a view illustrating various arrangements (alignments) of magnetic elements within a charger in accordance with one embodiment of the present invention.
Figure 10B:
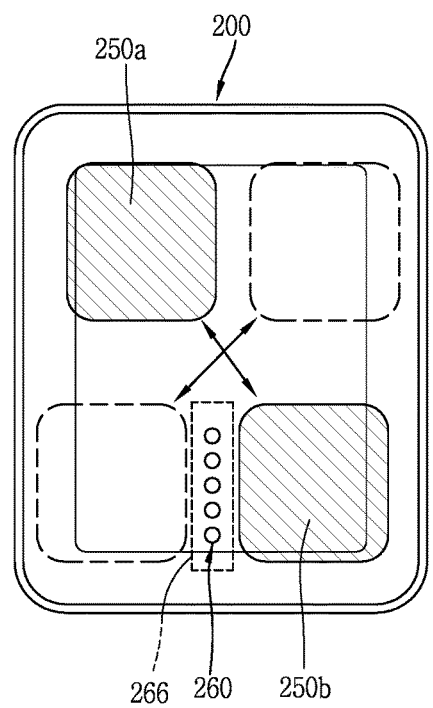
Figure 10C:
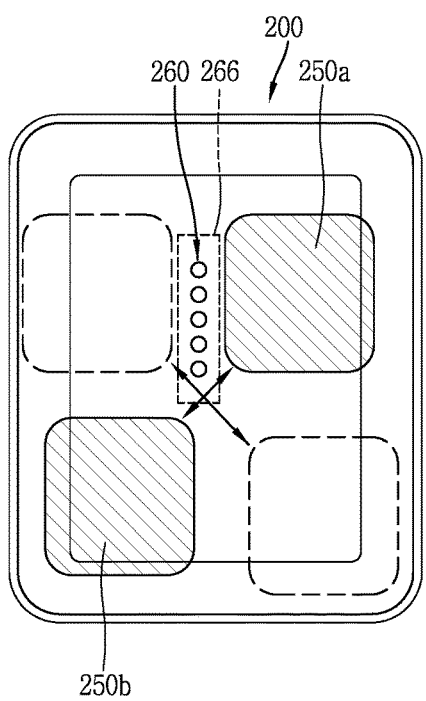
Figure 10D:
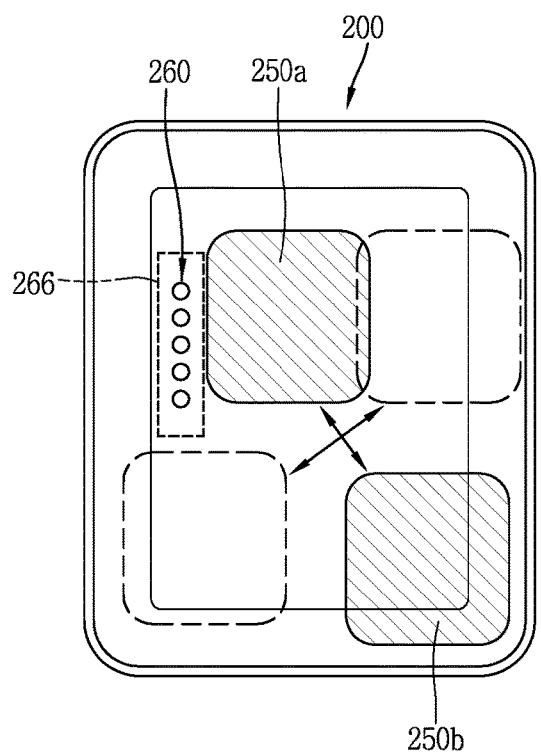

FIG. 10B illustrates a case where the charging connection terminal 260 is located on a center of a lower portion of the charger, FIG. 10C illustrates a case where the charging connection terminal 260 is located on a center of an upper portion of the charger, and FIG. 10D illustrates a case where the charging connection terminal 260 is located on one side of an upper portion of the charger. As illustrated in FIGS. 10A to 10D, it can be noticed that the magnetic element (250b in FIG. 10A) disposed at one side of the charging connection terminal 260, and the another magnetic element 250a is disposed at a position diagonal to the magnetic element 250b.

In this instance, the upper case 210 is provided with a top surface which is downwardly convex. The top surface includes an inclined portion 202 formed in a flat or curved surface from an edge to an inner side, and a base portion 201 extending from the inclined portion 202. The base portion 201 is a portion with which a rear central portion of the mobile terminal 300 is brought into contact, and the inclined portion 202 is a portion with which an edge portion 332 of the rear surface of the mobile terminal 300 is brought into contact. The mobile terminal 300 is placed on a correct position by the inclined portion 202 and the base portion 201. That is, the inclined portion 202 may guide the mobile terminal 300 to be located at the correct position.

The mobile terminal 300 may not be specifically limited to any type if it has a lower surface corresponding to the top surface of the charger 200. The mobile terminal 300 may be provided with the metal member 375 therein.

The metal member 375 may be provided at an inner side of the rear case 320 of the mobile terminal 300. The metal member 375 may be disposed on an area corresponding to the magnetic element 250 in a manner of being divided into plurality, and have a size wide enough to cover the magnetic element 250.

Hereinafter, this will be described in more detail.

FIG. 13 is a planar view illustrating an arrangement (alignment) of the metal member 375, the mobile terminal 300 for illustrating a coupling manner between the metal member 375 and the magnetic element 250, and a coupled state between the mobile terminal 300 and the charger 200.

Figure 13A:
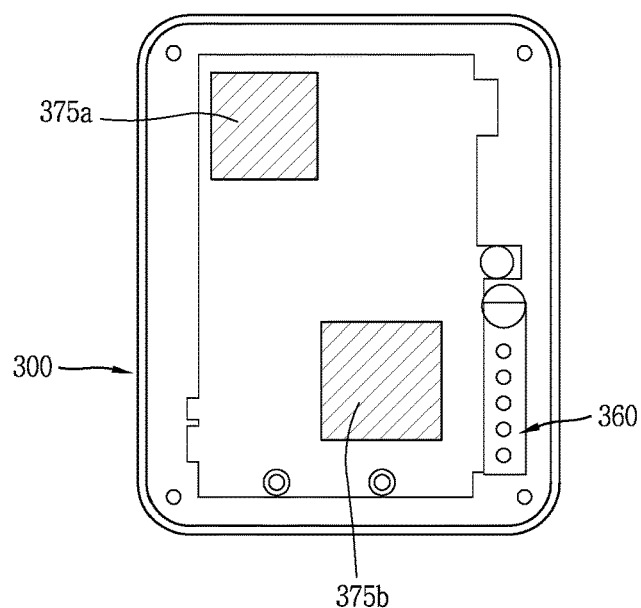
FIG. 13 is a view illustrating an arrangement (alignment) of a metal member and coupling between the metal member and magnetic elements in accordance with one embodiment of the present invention.
Figure 13B:
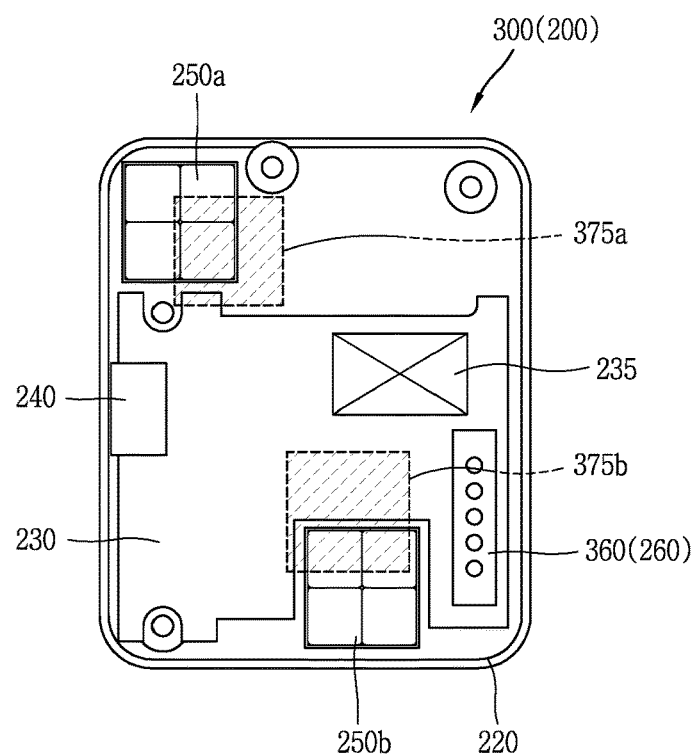

FIG. 13A illustrates that a plurality of metal members 375a and 375b are arranged on two or more areas. Referring to FIG. 13B, it can be noticed that the metal members 375a and 375b are disposed on positions corresponding to the magnetic elements 250a and 250b arranged on the plurality of areas. In more detail, the metal members 375a and 375b may be disposed above the magnetic elements 250a and 250b in a manner of overlapping at least part of the magnetic elements 250a and 250b or being adjacent to the magnetic elements 250a and 250b without overlapping them. That is, in one embodiment disposed herein, the metal member 375 is disposed at a position brought into contact with or facing the magnetic element 250.

As the metal members 375a and 375b are arranged at the positions corresponding to the plurality of magnetic elements 250a and 250b, a coupling force between the magnetic element 250 and the metal member 375 can increase, and in addition the mobile terminal 300 can be placed at a correct position on the charger 200.

Figure 13C:
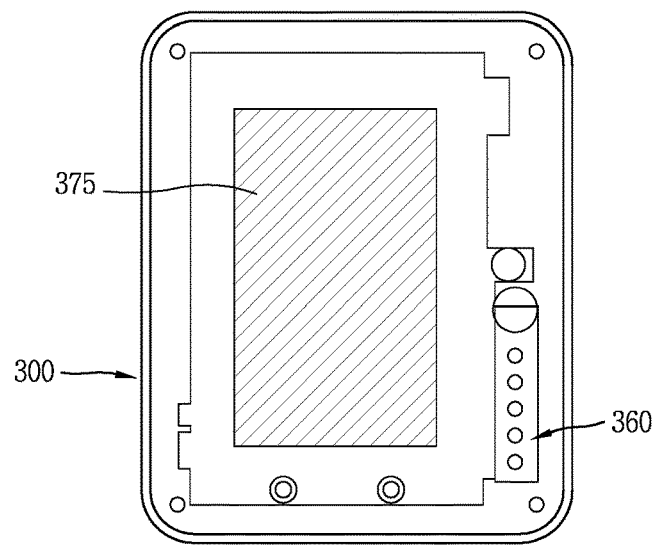
Figure 13D:
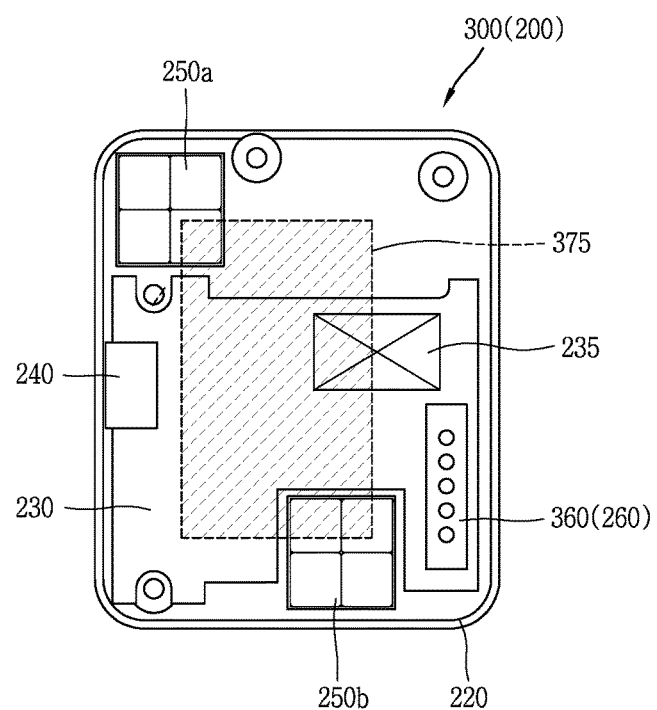

Also, FIG. 13C illustrates that the metal member 375 is provided by one. When the metal member 375 is provided by one, as illustrated in FIG. 13D, the metal member 375 may be disposed in a manner of overlapping areas of the plurality of magnetic elements 250a and 250b or adjacent to the areas of the magnetic elements 250a and 250b.

Also, in one embodiment disclosed herein, to shield a magnetic field of the magnetic element 250, the magnetic element 250 may be arranged in a metal container 255 or above a metal sheet 256. For example, the magnetic element 250 may be arranged within the metal container 255 which has a bottom surface and side surfaces and simultaneously the metal sheet 256 may be provided below the metal container 255, thereby reducing an affection of the magnetic field formed up to an outside of the charger 200.

Figure 9:
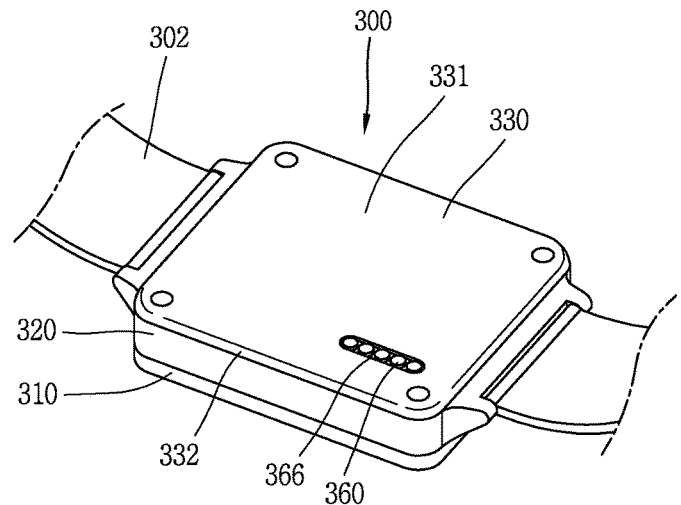
FIG. 9 is a rear perspective view of a mobile terminal in accordance with one embodiment of the present invention.

FIG. 9 is a rear perspective view of a mobile terminal in accordance with one embodiment of the present invention. As illustrated in FIG. 9, the mobile terminal 300 is a watch type mobile terminal, and includes the front case 310 disposed on an upper side, the rear case 320 coupled to the front case 310 and having components therein, and the battery case 330 covering the rear case 320. The charging terminal 360 is provided on one side of a rear surface of the battery cover 330. The charging terminal 360 is provided with an accommodation groove 366 for preventing the rear surface of the battery case 330 from being spaced apart from the base portion 201 of the charger 200 due to an elastic member embedded in the charging connection terminal 260. Also, the battery case 330 includes a rear central portion 331 that is flat and located at a center, and a rear edge portion 332 inclined from the rear central portion 331. The rear central portion 331 and the rear edge portion 332 have shapes corresponding to the base portion 202 and the inclined portion 201, respectively.

FIGS. 11 and 12 are sectional views illustrating a coupled state between a mobile terminal and a charger in accordance with one embodiment of the present invention.

As illustrated in FIGS. 11 and 12, the front case 310 is disposed on the top surface of the mobile terminal 300 and accommodates therein the display unit 351. A second printed circuit board 340 is disposed beneath the display unit 351, and the charging terminal 360 is electrically connected to the second printed circuit board 340. Also, the internal battery 370 is disposed beneath the second printed circuit board 340 to be charged by the charger 200. The metal member 375 is arranged beneath the internal battery 370.

Hereinafter, a second embodiment according to the present invention will be described.

Figure 14:
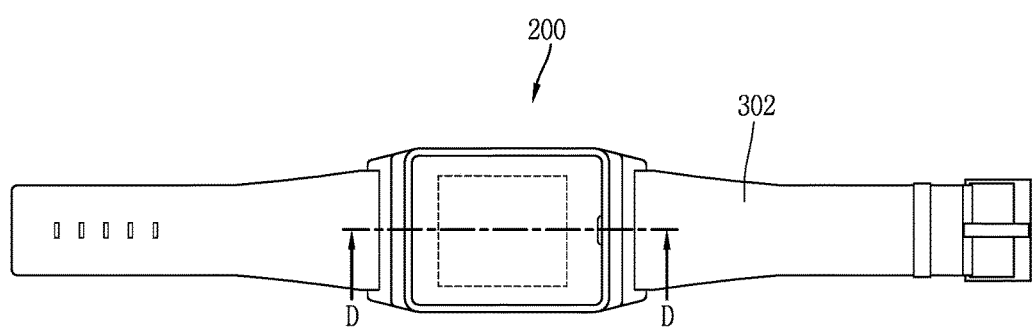
FIG. 14 is a planar view of a watch type mobile terminal in accordance with one embodiment of the present invention.
Figure 15:
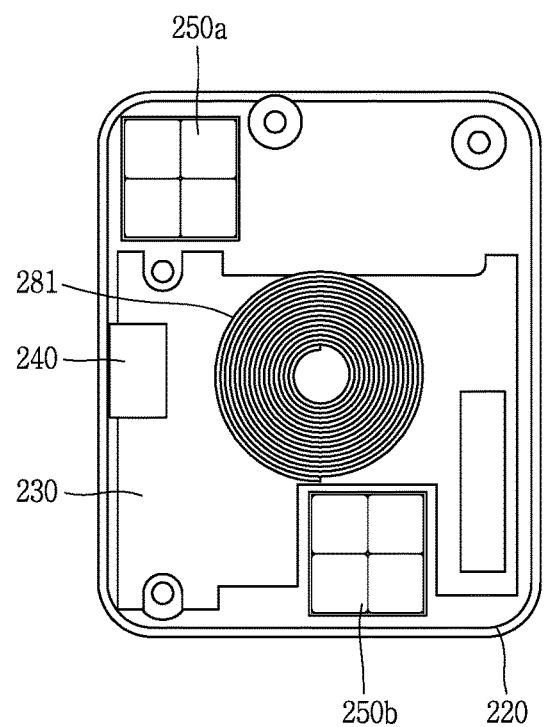
FIG. 15 is an inner planar view of a charger in accordance with another embodiment of the present invention.
Figure 16:
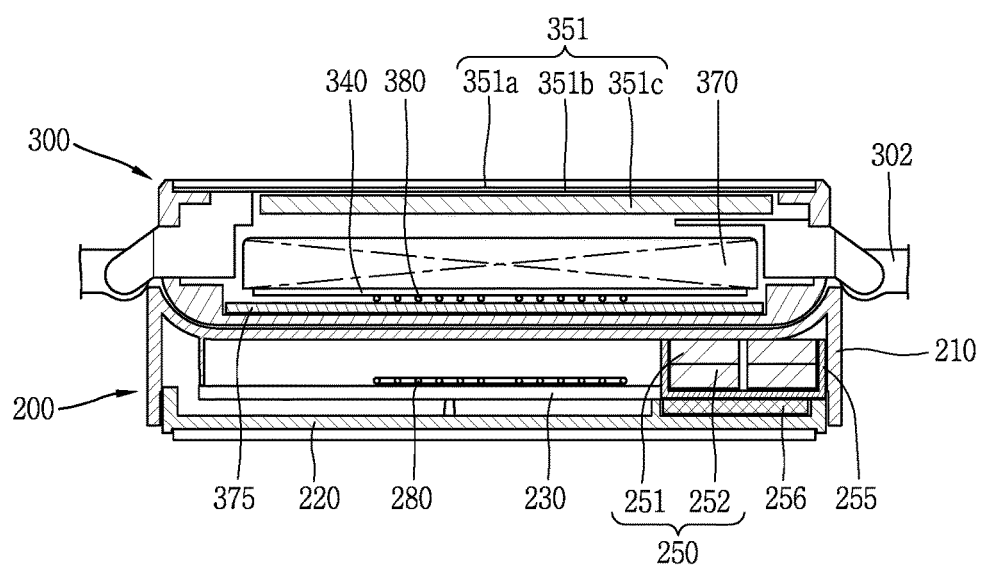
FIG. 16 is a sectional view illustrating a coupled state between a mobile terminal and a charger, taken along the line DD of FIG. 14.

FIG. 14 is a planar view of a watch type mobile terminal in accordance with one embodiment of the present invention, FIG. 15 is an inner planar view of a charger 200 in accordance with a second embodiment of the present invention, and FIG. 16 is a sectional view illustrating a coupled state between a mobile terminal and a charger, taken along the line DD of FIG. 14.

As illustrated in FIGS. 14 to 16, a charging assembly of the mobile terminal 300 according to a second embodiment disclosed herein may include the mobile terminal 300 and the charger 200. The mobile terminal 300 includes a receiving coil 380, and the charger 200 includes a transmitting coil 280 (281, 282) for performing transmission and reception with the receiving coil 380.

In this instance, the receiving coil 380 is electrically connected with the second printed circuit board 340, and the magnetic element 250 and the metal member 375 are the same as those of the foregoing embodiment, so detailed description thereof will be omitted.

The second embodiment disclosed herein illustrates wireless charging enabled by the transmitting coil 280 and the receiving coil 380. The wireless charging may be implemented by magnetic induction or electromagnetic resonance. The transmitting coil 280 and/or the receiving coil 380 may be implemented as a planar spiral type, or a cylindrical solenoid type.

Also, the transmitting coil 280 and the receiving coil 380 may be implemented as at least one spiral type coil or at least one solenoid type coil.

Figure 17:
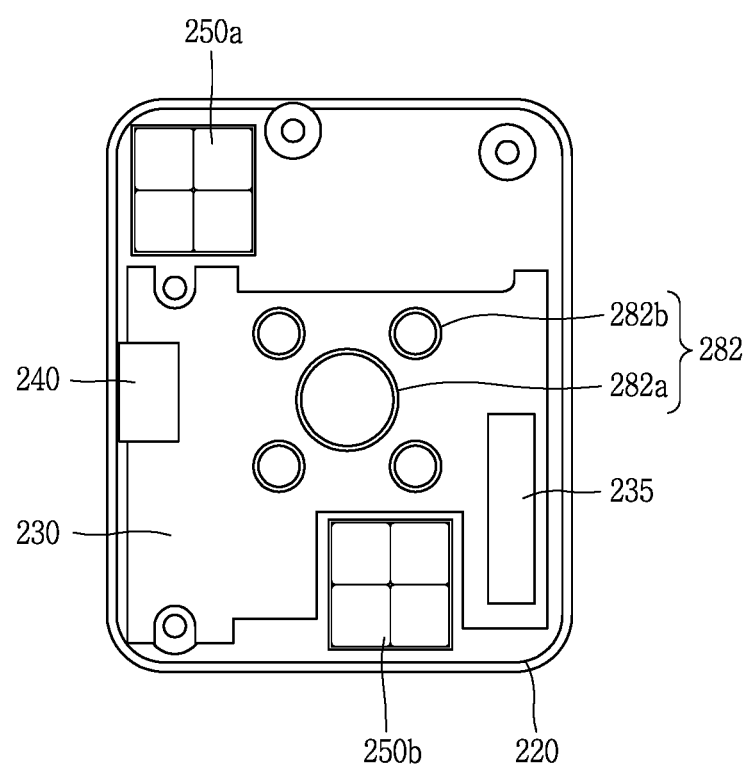
FIG. 17 is an inner planar view of a charger in accordance with another embodiment of the present invention.
Figure 18:
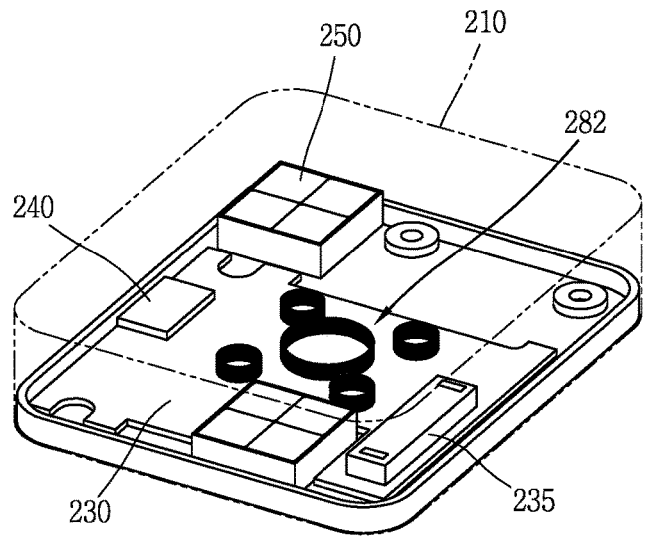
FIG. 18 is an inner perspective view of the charger in accordance with the another embodiment of the present invention.
Figure 19:
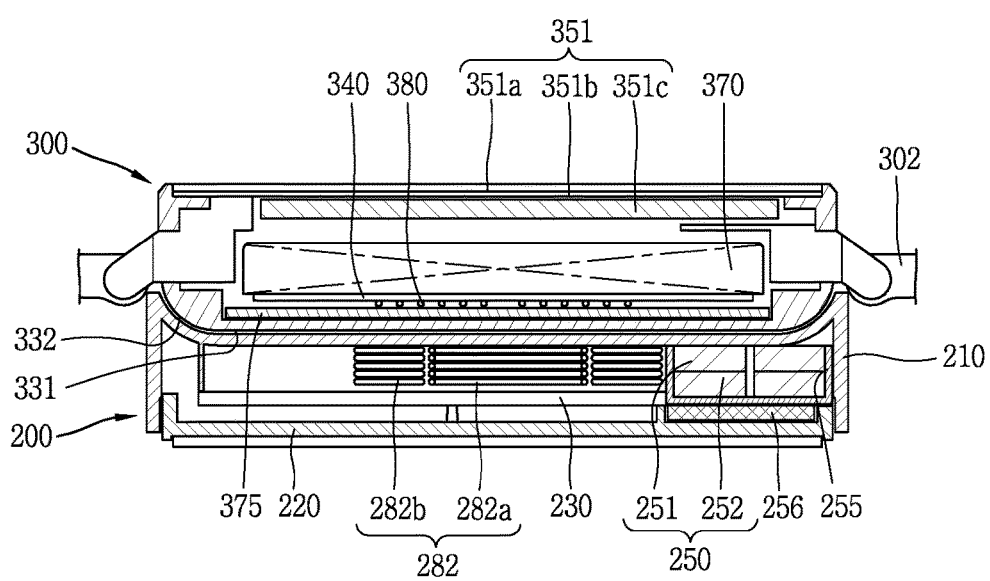
FIG. 19 is a sectional view illustrating a coupled state between a mobile terminal and a charger in accordance with another embodiment of the present invention.

FIG. 15 illustrates the transmitting coil 281 implemented as one spiral type coil, and FIGS. 17 to 19 illustrate the transmitting coil 282 including a plurality of coils each implemented as the solenoid type. In this instance, the plurality of coils include a first coil 282a disposed at a center and formed in a shape of a greater circle, and a plurality of second coils 282b disposed around the first coil 282a and each formed in a shape of a smaller circle. FIGS. 17 to 19 illustrate the plurality of solenoid type coils, but such embodiment may also be equally applied to a spiral type coil, and also be applied to the receiving coil 380.

In this manner, when the plurality of coils are used, a detection area between the charger 200 and the mobile terminal 300 may increase, thereby facilitating wireless transmission and reception. The detection area refers to an area where the charger 200 can detect presence of the mobile terminal 300.

As illustrated in FIG. 16, the mobile terminal 300 according to the second embodiment includes the internal battery 370 disposed below the display unit 351, and the second printed circuit board 340 and the receiving coil 380. In this instance, the receiving coil 380 is disposed on a lower surface of the second printed circuit board 340, and the transmitting coil 280 is disposed on a top surface of the first printed circuit board 230 such that the receiving coil 380 and the transmitting coil 280 can be arranged close to each other. As the receiving coil 380 and the transmitting coil 280 are arranged adjacent to each other, efficiency of wireless power transmission can be improved. This results from that efficiency of wireless power transmission specifically according to the induction coupling method, of the wireless charging methods, are affected by an alignment and a distance between the charger 200 and the mobile terminal 300.

Figure 21:
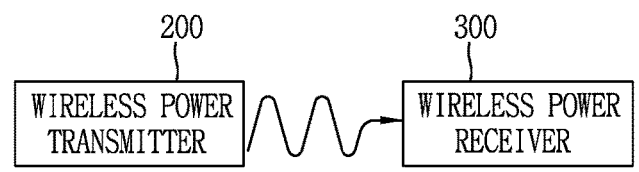
FIG. 21 is a conceptual view illustrating wireless charging in accordance with one embodiment of the present invention.
Figure 22:
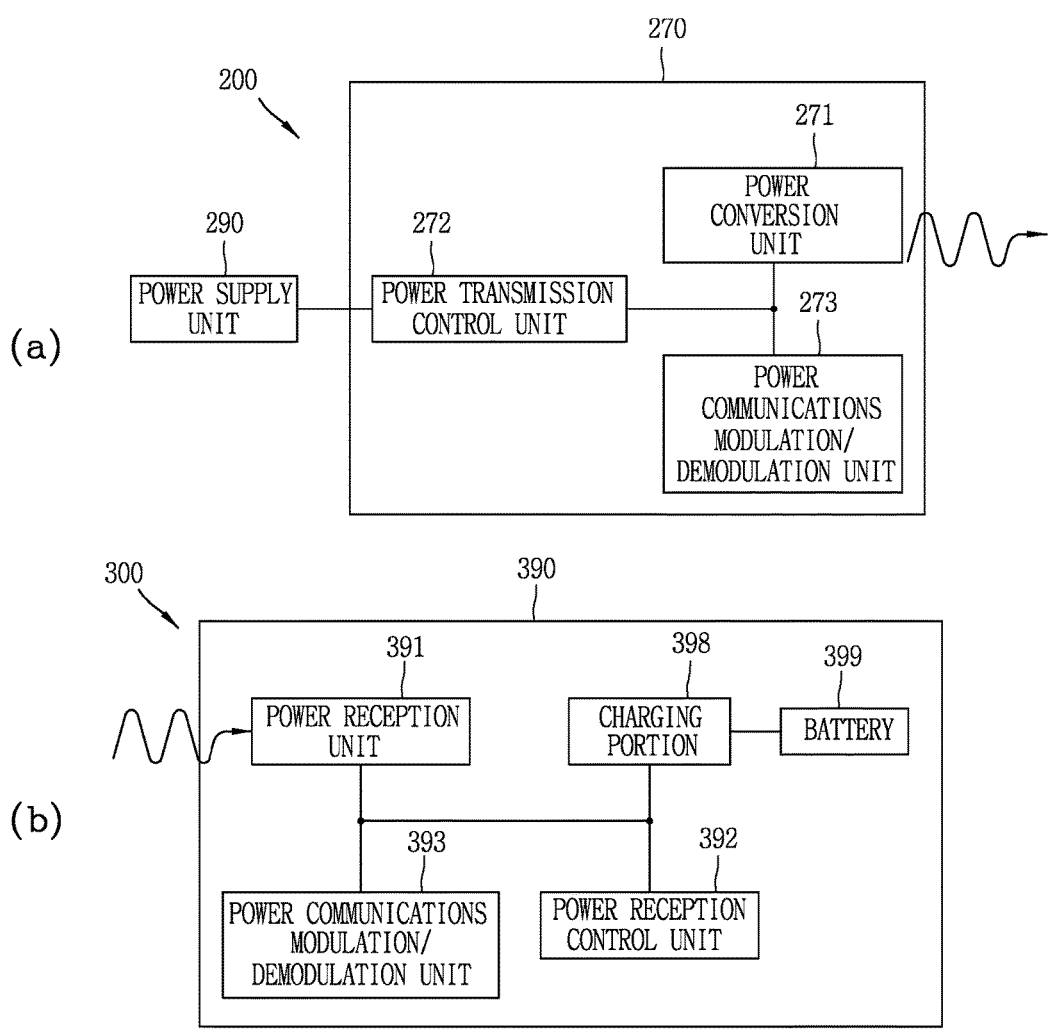
FIG. 22 is a block diagram exemplarily illustrating configurations of a mobile terminal and a charger in accordance with one embodiment of the present invention.
Figure 23:
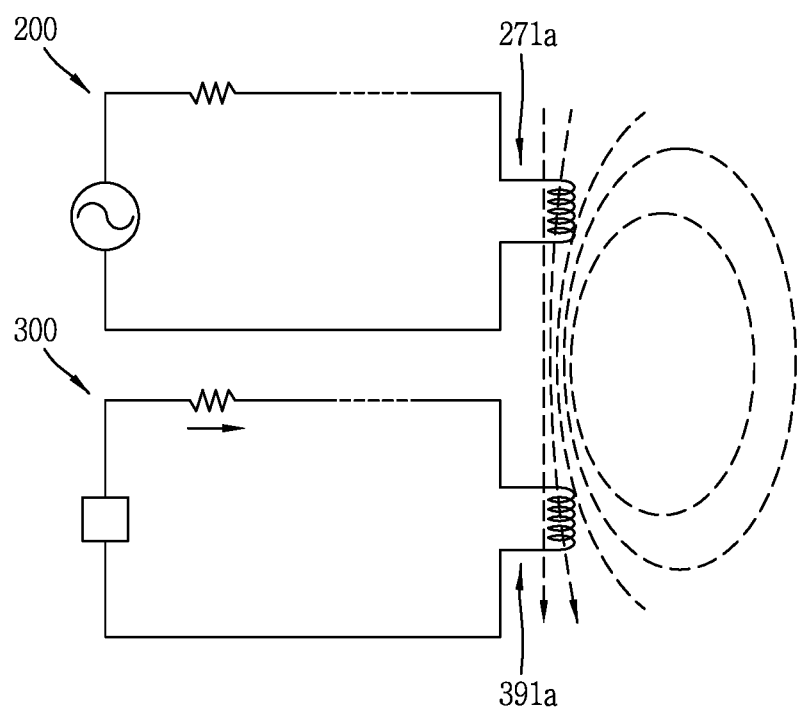
FIG. 23 is a conceptual view illustrating wireless power transmission from a charger to a mobile terminal according to an inductive coupling method.

FIG. 21 is a conceptual view illustrating wireless charging in accordance with one embodiment of the present invention, FIG. 22 is a block diagram exemplarily illustrating configurations of a mobile terminal and a charger in accordance with one embodiment of the present invention, and FIG. 23 is a conceptual view illustrating wireless power transmission from a charger to a mobile terminal according to an inductive coupling method.

Hereinafter, wireless charging methods will be described, with reference to FIGS. 21 to 23. In this instance, the charger 200 may be a wireless power transmitter, and the mobile terminal 300 may be a wireless power receiver.

FIG. 22 is an exemplary view conceptually illustrating the charger and the mobile terminal according to embodiments disclosed herein. The charger 200 is a power transmitter that wirelessly transmits power required for the mobile terminal 300.

The charger 200 is a wireless charging apparatus that charges the battery of the mobile terminal 300 by wirelessly transmitting power. The charger 200 can be implemented into various forms of transmitting power to the mobile terminal 300 requiring for power in a non-contact state.

The mobile terminal 300 is a device that is operated by wirelessly receiving power from the charger 200. Also, the mobile terminal 300 may charge the battery using the received wireless power.

Meanwhile, the mobile terminal receiving power in the wireless manner described in this specification should be construed as a device which includes every portable electronic device, for example, an input/output device such as a keyboard, a mouse and an auxiliary output device, a mobile phone, a cellular phone, a smart phone, a personal digital assistant (PDA), a portable multimedia player (PMP), a tablet, or a multimedia device.

The mobile terminal 300 may be the mobile communication terminal (e.g., the mobile phone, the cellular phone, the tablet, etc.) or the multimedia device.

Meanwhile, the charger can use at least one wireless power transmitting method for transmitting power to the mobile terminal 300 in a wireless manner without an inter-contact with the mobile terminal 300. That is, the charger 200 may transmit power by at least one of an inductive coupling method executed based on electromagnetic induction generated by a wireless power signal, and an electromagnetic resonance coupling method executed based on electromagnetic resonance generated by a wireless power signal of a specific frequency. In this instance, the non inter-contact refers to absence of an electric connection through a wire, but does not refer to absence of a physical contact between the charger 200 and the mobile terminal 300.

The wireless power transmission according to the inductive coupling is a technology of transmitting power in a wireless manner using a primary coil and a secondary coil, and refers to transmitting power in a manner that a current is induced to another coil by a changing magnetic field generated on one coil by electromagnetic induction.

The wireless power transmission according to the resonance coupling refers to transmitting power from the charger 200 to the mobile terminal 300 by electromagnetic resonance that is generated in the mobile terminal 300 by a wireless power signal transmitted from the charger 200.

Hereinafter, embodiments of the charger 200 and the mobile terminal 300 disclosed herein will be described in more detail.

FIG. 22 is a block diagram exemplarily illustrating configurations of the mobile terminal 300 and the charger 200 which can be employed in embodiments according to the present invention.

As illustrated in FIG. 22A, the charger 200 includes a power transmission unit 270. The power transmission unit 270 may include a power conversion unit 271 and a power transmission control unit 272.

The power conversion unit 271 converts power supplied from a transmitting-side power supply unit 290 into a wireless power signal and transfers the wireless power signal to the mobile terminal 300. The wireless power signal transferred by the power conversion unit 271 is generated in a form of a magnetic field or electromagnetic field that has an oscillating characteristic. For this, the power conversion unit 271 may include a coil generating the wireless power signal. For example, the power conversion unit 271 may be the transmitting coil 280.

The power conversion unit 271 may include a component for generating a different type of wireless power signal according to each power transmission method.

In some embodiments, the power conversion unit 271 may include a primary coil (corresponding to the transmitting coil 280) that forms a changing magnetic field for inducing a current on the secondary coil (corresponding to the receiving coil 380) of the mobile terminal 300 according to the inductive coupling method. Also, in some embodiments, the power conversion unit 271 may include a coil (or an antenna) that forms a magnetic field having a specific resonant frequency for generating a resonance phenomenon in the mobile terminal 300 according to the resonance coupling method.

Meanwhile, the power conversion unit 271 may further include a circuit that adjusts characteristics of a used frequency, an applied voltage and current and the like for generating the wireless power signal.

The power transmission control unit 272 controls each component included in the power transmission unit 270. In one embodiment, the power transmission control unit 272 may be implemented to be integrated with another controller (not illustrated) that controls the charger 200.

The power transmission control unit 272 may also decide at least one characteristic of the frequency, the voltage and the current of the power conversion unit 271 for generating the wireless power signal. The decision of the characteristic may be executed by a condition associated with the charger 200 or a condition associated with the mobile terminal 300.

The power transmission control unit 272 may receive a power control message from the mobile terminal 300. The power transmission control unit 272 may decide at least one characteristic of the frequency, the voltage and the current of the power conversion unit 271 on the basis of the received power control message, and execute a different control operation based on the power control message.

For example, the power transmission control unit 272 may decide at least one characteristic of the frequency, the voltage and the current, which are used for generating the wireless power signal, according to the power control message which includes at least one of rectified power amount information, charging state information and identification information all associated with the mobile terminal 300.

For receiving the power control message, the charger 200 may further include a power communications modulation/demodulation unit 273 electrically connected to the power conversion unit 271. The power communications modulation/demodulation unit 273 may be employed to receive the power control message by demodulating the wireless power signal modulated by the mobile terminal 300.

Besides, the power transmission control unit 272 may also acquire the power control message by receiving user data, which includes the power control message, through a communication unit (not illustrated) included in the charger 200.

As illustrated in FIG. 22B, the mobile terminal 300 includes a power supply unit 390. The power supply unit 390 supplies power required for an operation of the mobile terminal 300. The power supply unit 390 may include a power reception unit 391 and a power reception control unit 392.

The power reception unit 391 receives power that is transferred from the charger 200 in a wireless manner.

The power reception unit 391 may include a component employed for receiving the wireless power signal according to a wireless power transmission method.

The power reception unit 391 may receive power according to at least one wireless power transmission method, and in this instance, may include different components required for each transmission method.

First, the power reception unit 291 may include a coil (the receiving coil 280) for receiving a wireless power signal transferred in a form of a magnetic field or electromagnetic field having an oscillating characteristic.

In one embodiment, the power reception unit 391 may include, as a component according to the inductive coupling method, a secondary coil on which a current is induced by a changing magnetic field. Also, the power reception unit 391 may include, as a component according to the resonance coupling method, a coil on which a resonance phenomenon is generated by a magnetic field having a specific resonant frequency, and a resonance generating circuit.

The power reception control unit 392 controls each component included in the power supply unit 390. In more detail, the power reception control unit 392 may transmit a power control message to the charger 200. The power control message may indicate the transmission of the wireless power signal or termination of the transmission of the wireless power signal. Also, the power control message may indicate the charger 200 to adjust the characteristic of the wireless power signal.

The power reception control unit 392 may transmit the wireless control message through the wireless power signal.

For transmitting the power control message, the mobile terminal 300 may further include a power communications modulation/demodulation unit 393 that is electrically connected to the power reception unit 391. The power communications modulation/demodulation unit 393, similar to that of the charger 200, may be employed for transmitting the power control message through the wireless power signal. The power communications modulation/demodulation unit 393 may be used as means for adjusting a current and/or a voltage that flows on the power conversion unit 271 of the wireless power transmitter 100.

Hereinafter, description will be given of a method of using the power communications modulation/demodulation units 273 and 393 of the charger 200 and the mobile terminal 300 for transmitting and receiving the power control message through the wireless power signal.

The wireless power signal generated by the power conversion unit 271 is received by the power reception unit 391. In this instance, the power reception control unit 392 controls the power communications modulation/demodulation unit 393 of the mobile terminal 300 to demodulate the wireless power signal. For example, the power reception control unit 392 executes a demodulation procedure in a manner of changing reactance of the power communications modulation/demodulation unit 393 connected with the power reception unit 391 and varying an amount of power received from the wireless power signal accordingly. The variation of the amount of power received from the wireless power signal brings about a change in a current and/or a voltage of the power conversion unit 271 which generates the wireless power signal. In this instance, the power communications modulation/demodulation unit 273 of the charger 200 executes a demodulation process in a manner of detecting the change in the current and/or the voltage of the power conversion unit 271.

That is, the power reception control unit 392 generates a packet including the power control message desiring to transmit to the charger 200, and modulates the wireless power signal to include the packet. The power transmission control unit 272 decodes the packet based on the execution result of the demodulation process, and accordingly acquires the power control message included in the packet.

The power reception control unit 392 may also transmit the power control message to the charger 200 by transmitting user data, which includes the power control message, through a communication unit (not illustrated) included in the mobile terminal 300.

In addition, the power supply unit 390 may further include a charging portion 398 and a battery 399. The battery 399 may be the same as the internal battery 370.

The mobile terminal 300 that receives power for its operation from the power supply unit 390 may operate using power transferred from the charger 200 or charge the battery 399 using the transferred power and then operate using the power charged in the battery 399. In this instance, the power reception control unit 392 may control the charging portion 398 to perform charging using the transferred power.

FIG. 23 is a conceptual view illustrating wireless power transmission from a charger to a mobile terminal according to embodiments employing an inductive coupling method.

In case where the power transmission of the charger 200 is executed according to the inductive coupling method, when intensity of a current flowing on the primary coil within the power transmission unit 270 changes, a magnetic field flowing through the primary coil is changed due to the current. The changed magnetic field generates an induced electromotive force on the secondary coil within the mobile terminal 300.

According to this method, the power conversion unit 271 of the charger 200 includes a transmitting (Tx) coil 271a that serves as the primary coil during magnetic induction. Also, the power reception unit 391 of the mobile terminal 300 includes a receiving (Rx) coil 391a that serves as the secondary coil during the magnetic induction. In this instance, the Tx coil 271a may be the transmitting coil 380 and the Rx coil 391a may be the receiving coil 380.

First, the charger 200 and the mobile terminal 300 are arranged such that the Tx coil 271a of the charger 200 and the Rx coil 391a of the mobile terminal 300 are located adjacent to each other. Afterwards, when the power transmission control unit 272 controls the current of the Tx coil 271a to be changed, the power reception unit 391 controls power to be supplied to the mobile terminal 300 using the electromotive force induced in the receiving coil 391a.

The efficiency of the wireless power transmission according to the inductive coupling method is less affected by a frequency characteristic, but affected by the alignment and the distance between the charger 200 and the mobile terminal 300 having the coils, respectively.

Meanwhile, the charger 200, as illustrated in FIGS. 17 and 18, may include one or more transmitting coils 282a and 282b. The charger 200 can enhance the power transmission efficiency by selectively using some coils, which are appropriately aligned with the receiving coil 391a of the mobile terminal 300, of the one or more coils.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL AVAILABILITY

Embodiments according to the present invention can be applied to an assembly for charging a mobile terminal.

The invention claimed is:

1. A charging assembly of a mobile terminal, the assembly comprising:
  a charger having an upper case forming a top surface and a side surface, and a lower case coupled to the lower portion of the upper case, for forming an inner space in which parts are embedded; and
  a mobile terminal seated in the charger and chargeable by being electrically connected to the charger, wherein in a plurality of areas within the inner space, magnetic elements are arranged, and a metal member is arranged in such a manner that at least a part thereof is arranged in an area which overlaps or is adjacent to the magnetic elements so that the metal member is attached to the magnetic elements due to attraction with the magnetic elements, wherein the top surface comprises an inclined portion which is bent downward so as to be in contact with the rear edge portion of the mobile terminal, and a flat base portion which extends from the inclined portion and is in contact with the rear central portion of the mobile terminal, and wherein the magnetic elements arranged in the plurality of areas are placed diagonally to each other, wherein the charger includes a charging connection terminal disposed on one side at an inner side thereof, wherein the magnetic elements include a first magnetic element and a second magnetic element, and wherein the first magnetic element is disposed at one side of the charging connection terminal and the second magnetic element is disposed at a position diagonal to the first magnetic element.

2. The assembly of claim 1, wherein the charger further comprises an external battery provided within the inner space to operate the mobile terminal.

3. The assembly of claim 2, wherein the charging connection is configured as a plurality of pins, and is externally exposed.

4. The assembly of claim 3, wherein the magnetic elements are laminated into at least two layers.

5. The assembly of claim 1, wherein the magnetic elements are accommodated in a metal container.

6. The assembly of claim 5, wherein below the metal container is provided a metal sheet shielding a magnetic field.

7. The assembly of claim 2, wherein a part of the charging connection terminal is externally exposed through the top surface, and the mobile terminal is provided with a charging terminal brought into contact with the charging connection terminal.

8. The assembly of claim 7, wherein the charging connection terminal is a pogo pin with an elastic member embedded therein.

9. The assembly of claim 7, wherein a part of the charging connection terminal is surrounded by a magnet provided within the inner space.

10. The assembly of claim 6, wherein the mobile terminal comprises:

a front case accommodating a display unit therein;

a rear case provided on a lower portion of the front case and having components therein; and a battery case provided on a lower portion of the rear case and having an inner battery therein, the battery case covering the rear case, wherein the charging terminal is disposed in an inwardly-recessed accommodation groove.

11. The assembly of claim 10, wherein the metal member is provided at an inner side of the rear case.

12. The assembly of claim 1, wherein the metal member is provided by one or in plurality.

13. The assembly of claim 10, wherein the display unit outputs which one of the internal battery or external battery is used.

14. The assembly of claim 1, wherein the charger comprises a transmitting coil configured to transmit power in a wireless manner, and the mobile terminal comprises a receiving coil configured to receive power in a wireless manner through transmission and reception with the transmitting coil, wherein the power wirelessly received from the transmitting coil is charged in the battery of the mobile terminal.

15. The assembly of claim 14, wherein the transmitting coil is a spiral type coil or a solenoid type coil.

16. The assembly of claim 15, wherein the receiving coil is a spiral type coil or a solenoid type coil.

17. The assembly of claim 15, wherein the coil comprises a first coil disposed at a center, and a plurality of second coils disposed around the first coil.

18. The assembly of claim 14, wherein the transmitting coil is disposed on a top surface of a first printed circuit board provided within the charger, and the receiving coil is disposed on a lower surface of a second printed circuit board provided within the mobile terminal.

* * * * *